United States Patent
Koike

(10) Patent No.: US 8,159,166 B2
(45) Date of Patent: Apr. 17, 2012

(54) MOTOR DRIVE CIRCUIT AND ELECTRIC POWER STEERING APPARATUS

(75) Inventor: Susumu Koike, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 250 days.

(21) Appl. No.: 12/588,843

(22) Filed: Oct. 29, 2009

(65) Prior Publication Data

US 2010/0109588 A1    May 6, 2010

(30) Foreign Application Priority Data

Nov. 4, 2008  (JP) ................................. 2008-283278

(51) Int. Cl.
  *H02P 7/08* (2006.01)
(52) U.S. Cl. ............... 318/400.21; 318/400.01; 318/700
(58) Field of Classification Search ............. 318/400.01, 318/400.21, 700
  See application file for complete search history.

(56) References Cited

U.S. PATENT DOCUMENTS

| | | | |
|---|---|---|---|
| 5,306,990 A | | 4/1994 | Hofsass et al. |
| 6,222,346 B1 * | | 4/2001 | Mori ............................. 320/134 |
| 2003/0057899 A1 | | 3/2003 | Lacroix |
| 2008/0018269 A1 * | | 1/2008 | Wyatt et al. ...................... 318/53 |
| 2010/0079095 A1 * | | 4/2010 | Shibata ......................... 318/474 |
| 2010/0264857 A1 * | | 10/2010 | Nagase ......................... 318/139 |

FOREIGN PATENT DOCUMENTS

| | | | |
|---|---|---|---|
| FR | 2 682 831 A1 | | 4/1993 |
| JP | A-11-146558 | | 5/1999 |
| JP | B2-3087705 | | 9/2000 |
| JP | 2004166441 A | * | 6/2004 |
| JP | 2004282963 A | * | 10/2004 |

OTHER PUBLICATIONS

European Search Report issued in European Application No. EP 09 17 4847.5 on Jan. 28, 2011.

* cited by examiner

*Primary Examiner* — Walter Benson
*Assistant Examiner* — Kawing Chan
(74) *Attorney, Agent, or Firm* — Oliff & Berridge, PLC

(57) ABSTRACT

A motor drive circuit includes a transistor that is connected in parallel to a first voltage divider resistance that forms a voltage divider circuit between the source and the gate of a second interrupting MOSFET. If a reverse connection of the battery occurs, a compensation drive circuit turns on the transistor using an output from the battery so that the source and the gate of the second interrupting MOSFET are short-circuited. Thus, formation of a closed circuit that includes the battery and the inverter circuit is prevented. As a result, it is possible to prevent both terminals of the battery from being short-circuited.

6 Claims, 5 Drawing Sheets

MOTOR DRIVE CIRCUIT AND ELECTRIC POWER STEERING APPARATUS

INCORPORATION BY REFERENCE

The disclosure of Japanese Patent Application No. 2008-283278 filed on Nov. 4, 2008 including the specification, drawings and abstract is incorporated herein by reference in its entirety.

BACKGROUND OF THE INVENTION

1. Field of the Invention

The invention relates to a motor drive circuit that includes an inverter circuit, and an electric power steering apparatus.

2. Description of the Related Art

In an electric power steering apparatus that includes a motor drive circuit, in an abnormal situation where an inverter circuit cannot be used, an alternating-current motor is rotated in accordance with a steering operation performed on a steering wheel. In this case, the alternating-current motor serves as an electric power generator, and, for example, a battery (direct-current power source) of a vehicle is charged with the electric power generated by the alternating-current motor. In this case, the steering resistance includes the resistance for generating electric power by converting kinetic energy into electric energy (hereinafter, referred to as "power generation resistance").

FIG. 5 shows a motor drive circuit with which the power generation resistance is excluded from the steering resistance. In the motor drive circuit shown in FIG. 5, a pair of interrupting MOSFETs connected in series is arranged in a feed line that connects the positive electrode of a direct-current power source to an inverter circuit. These interrupting MOSFETs are connected to the feed line in such a manner that parasitic diodes thereof are in the opposite orientations. Therefore, the situation where an electric current flows through both the parasitic diodes is avoided.

The interrupting MOSFETs are turned on and off by respective drive circuits. Each drive circuit is formed by connecting a voltage divider circuit and a drive MOSFET in series in this order in the direction from the source of the interrupting MOSFET toward the negative electrode of the direct-current power source, and connecting the output of the voltage divider circuit to the gate of the interrupting MOSFET.

In a normal situation, a control circuit continuously transmits gate signals to the drive MOSFETs to keep the interrupting MOSFETs on so that conduction between the direct-current power source and the inverter circuit is permitted. In contrast, in an abnormal situation where the inverter circuit cannot be used, transmission of gate signals to the drive MOSFETs is stopped so that the interrupting MOSFETs are turned off. Thus, conduction between the direct-current power source and the inverter circuit is interrupted so that the power generation resistance of the alternating-current motor is excluded from the steering resistance.

For example, Japanese Patent Application Publication No. 11-146558 describes a technology in which a pair of MOSFETs connected in series is arranged in a power line in such a manner that parasitic diodes thereof are oriented in the opposite directions and conduction through the power line is interrupted by turning off the MOSFETs.

However, in the existing motor drive circuit described above, if the positive electrode and the negative electrode of the direct-current power source are erroneously connected in reverse to the motor drive circuit, gate voltage is supplied to the interrupting MOSFETs through the drive circuits and the interrupting MOSFETs are turned on, whereby a closed circuit including the direct-current power source and the inverter circuit is formed. Then, a short-circuit current flows through the closed circuit as indicated by arrowed dot lines A, and the terminals of the direct-current power source are short-circuited.

SUMMARY OF THE INVENTION

It is an object of the invention to provide a motor drive circuit that addresses the above-described problem, and an electric power steering apparatus that includes the motor drive circuit.

An aspect of the invention relates to a motor drive circuit that includes: an inverter that is placed between and connected to a positive electrode and a negative electrode of a direct-current power source; a pair of nonuse-time interrupting MOSFETs connected in series and arranged in a feed line that connects the positive electrode of the direct-current power source and the inverter circuit in such a manner that paired parasitic diodes are in the opposite orientations; a pair of main drive circuits which are formed by connecting voltage divider circuits and drive MOSFETs in series in this order in a direction from sources of the nonuse-time interrupting MOSFETs toward the negative electrode of the direct-current power source, and connecting outputs of the voltage divider circuits to gates of the nonuse-time interrupting MOSFETs; a control circuit that transmits gate signals to the pair of drive MOSFETs to keep the pair of nonuse-time interrupting MOSFETs on in a normal situation, and that stops transmission of the gate signals to the pair of drive MOSFETs to turn off the pair of nonuse-time interrupting MOSFETs in an abnormal situation where the inverter circuit is not able to be used; a compensation switch element that is connected in parallel to a resistance that forms the voltage divider circuit between the source and the gate of the nonuse-time interrupting MOSFET that has the parasitic diode in which an anode is arranged on a positive electrode side of the direct-current power source; and a compensation drive circuit that is connected to the compensation switch element and the negative electrode of the direct-current power source. When the positive electrode and the negative electrode of the direct-current power source are connected to the motor drive circuit properly, the compensation drive circuit turns off the compensation switch element. In an abnormal situation where the positive electrode and the negative electrode of the direct-current power source are connected in reverse to the motor drive circuit, the compensation drive circuit turns on the compensation switch element using an output from the direct-current power source connected to the motor drive circuit in reverse.

The compensation switch element is connected in parallel to the resistance that forms the voltage divider circuit between the source and the gate of the nonuse-time interrupting MOSFET in which the drain is arranged more proximal to the positive electrode of the direct-current power source than the source. If reverse connection of the direct-current power source occurs, the compensation drive circuit turns on the compensation switch using the output from the direct-current power source so that the source and the gate of the nonuse-time interrupting MOSFET are short-circuited. Thus, the nonuse-time interrupting MOSFET is kept off. In this case, a current path that includes the parasitic diodes is not formed.

That is, with the motor drive circuit, if reverse connection of the direct-current power source occurs, a closed circuit that includes the direct-current power source and the inverter circuit is not formed. Therefore, it is possible to prevent the both terminals of the direct-current power source from being short-circuited.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Figure 1:
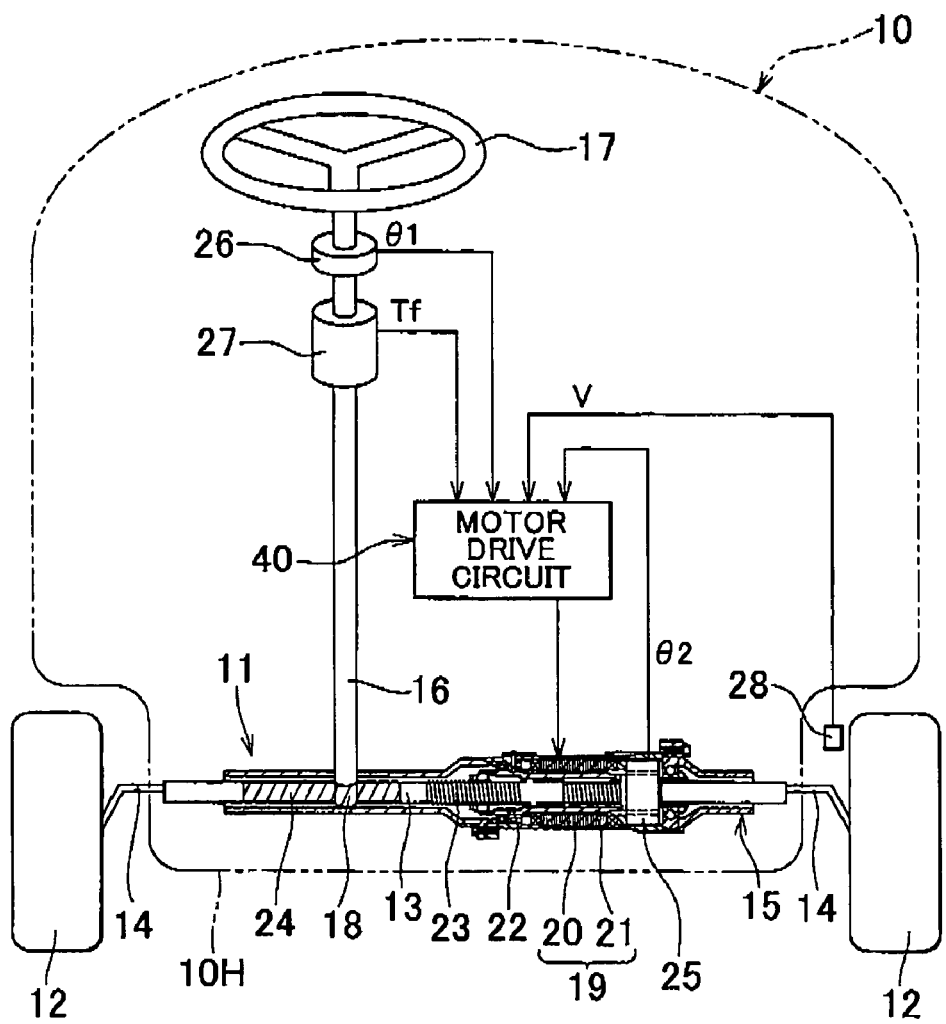
FIG. 1 is a view schematically showing a vehicle in which an electric power steering apparatus according to a first embodiment of the invention is mounted.

Hereafter, a first embodiment of the invention will be described with reference to FIG. 1 and FIG. 2. FIG. 1 shows a vehicle 10 that includes an electric power steering apparatus 11. The electric power steering apparatus 11 includes an inter-steered wheel shaft 13 that extends in the lateral direction of the vehicle 10, and the inter-steered wheel shaft 13 passes through a cylindrical housing 15 that is fixed to a vehicle body 10H. The respective ends of the inter-steered wheel shaft 13 are connected to steered wheels 12 via tie-rods 14.

The electric power steering apparatus 11 includes an alternating-current motor 19 (more specifically, a three-phase alternating-current motor: hereinafter, referred to as "motor 19") that serves as a drive source. A stator 20 of the motor 19 is fixed in the cylindrical housing 15, and the inter-steered wheel shaft 13 passes through a hollow portion of a rotor 21. A ball nut 22 that is fixed to the inner face of the rotor 21 is screwed to a ball screw portion 23 that is formed in the outer face of the inter-steered wheel shaft 13. Rotation of the rotor 21 causes linear motion of the ball screw portion 23. The motor 19 is provided with a rotational position sensor 25 that detects the rotational position θ2 of the rotor 21.

As shown in FIG. 1, a rack 24 is formed in one end portion of the inter-steered wheel shaft 13, and a pinion 18 formed at the lower end portion of a steering shaft 16 is meshed with the rack 24. A steering wheel 17 is fitted to the upper end portion of the steering shaft 16, and a torque sensor 27 and a steering angle sensor 26 are fitted to a middle portion of the steering shaft 16. Near the steered wheel 12, there is provided a vehicle speed sensor 28 that detects the vehicle speed V based on the rotational speed of the steered wheel 12.

Figure 2:
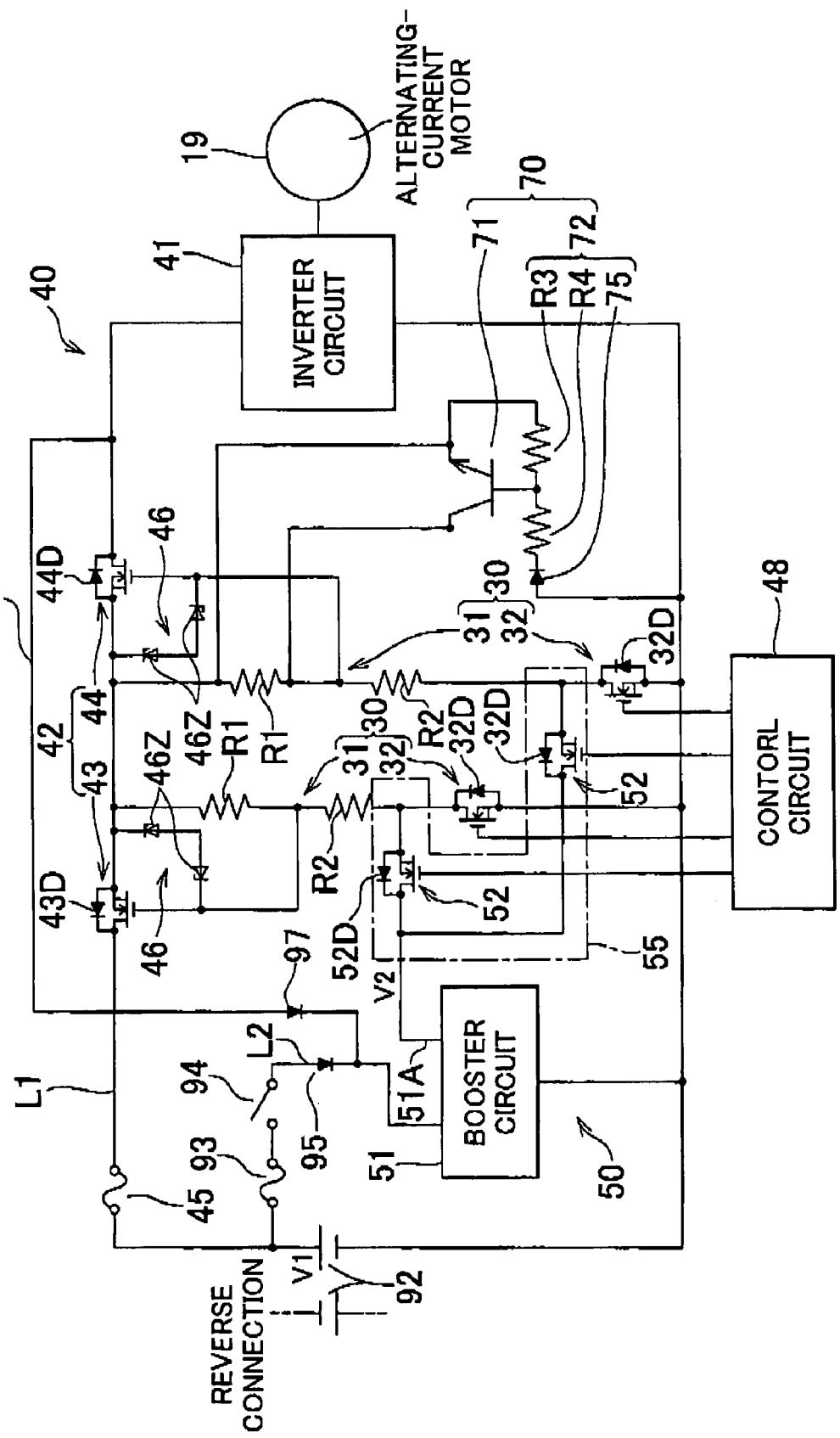
FIG. 2 is a circuit diagram of a motor drive unit.

In the vehicle 10, the motor 19 is driven by a motor drive circuit 40 shown in FIG. 2. An inverter circuit 41 in the motor drive circuit 40 is a three-phase bridge circuit that includes a U-phase circuit, a V-phase circuit, and a W-phase circuit (not shown) that are formed between the positive electrode and the negative electrode of a battery 92. The inverter circuit 41 converts a direct-current output from the battery 92 into a three-phase alternating current, and supplies the three-phase alternating current to the motor 19.

In a first feed line L1 that connects the positive electrode of the battery 92 to the inverter circuit 41 in the motor drive circuit 40, an interrupting circuit 42 that is formed by connecting a pair of interrupting MOSFETs 43 and 44 in series is provided. The interrupting MOSFETs 43 and 44 are N-channel MOSFETs, and include parasitic diodes 43D and 44D, respectively. For example, the sources of the interrupting MOSFETs 43 and 44 are connected to each other so that the parasitic diodes 43D and 44D are in the opposite orientations. That is, the cathode of the parasitic diode 43D of the first interrupting MOSFET 43 is arranged on the positive electrode side of the battery 92, and the cathode of the parasitic diode 44D of the second interrupting MOSFET 44 is arranged on the inverter circuit 41-side. Because the parasitic diodes 43D and 44D are in the opposite orientations, a current path that includes both the parasitic diodes 43D and 44D is not formed.

A fuse 45 is provided in the first feed line L1 at a position between the positive electrode of the battery 92 and the first interrupting MOSFET 43. In addition, overvoltage protection circuits 46, each of which is formed by connecting the anodes of a pair of zener diodes 46Z to each other, are provided between the gates and the sources of the respective interrupting MOSFET 43 and 44.

The interrupting MOSFETs 43 and 44 are turned on and off by a pre-driver circuit 50 that is included in the motor drive circuit 40. The pre-driver circuit 50 includes, for example, a charge-pump booster circuit 51. The booster circuit 51 is connected to a second feed line L2 that branches off from the first feed line L1 at a position between the positive electrode of the battery 92 and the fuse 45. When an ignition switch 94 provided in the second feed line L2 is turned on, conduction between the booster circuit 51 and the battery 92 is permitted. Then, a charge and discharge of a plurality of capacitors (not shown) provided in the booster circuit 51 are repeated, whereby the first voltage V1 (e.g. 12V) that is the voltage of the positive electrode of the battery 92 with respect to the negative electrode of the battery 92 is boosted to the second voltage V2 (e.g. 32V), and the second voltage V2 is supplied from a second voltage output portion 51A to a pair of main drive circuits 30, described later in detail.

A fuse 93 is provided in the second feed line L2 at a position between the ignition switch 94 and the positive electrode of the battery 92. A backflow prevention diode 95 where the cathode is arranged on the booster circuit 51-side is connected to the second feed line L2 at a position between the ignition switch 94 and the booster circuit 51. The booster circuit 51 is not limited to a charge-pump booster circuit, and may be formed with the use of a booster coil.

A feed line L3 connects the second feed line L2 at a portion on the cathode side of the diode 95 to the first feed line L1 at a portion on the drain side of the second interrupting MOSFET 44. The feed line L3 is provided to stably supply electric power to the pre-driver circuit 50 and a control circuit 48, for example, even if the electric power fluctuations occur in the second feed line L2 or electric power supply is interrupted due to contact failure of a connector. That is, the pre-driver circuit 51 and the control circuit 48 may receive the electric power from the battery 92 through two power lines. A backflow prevention diode 97 where the cathode is arranged on the booster circuit 51-side is provided in the feed line L3. Therefore, an electric current does not flow from the battery 92 to the inverter circuit 41 without passing through the interrupting MOSFETs 43 and 44.

The pre-driver circuit 50 includes the main drive circuits 30 for the respective interrupting MOSFETs 43 and 44. Each main drive circuit 30 is formed by connecting a voltage divider circuit 31 and a drive MOSFET 32 in series in this order in the direction from the source of the interrupting MOSFET toward the negative electrode of the battery 92, and connecting the output of the voltage divider circuits 31 to the gate of the interrupting MOSFET.

More specifically, each voltage divider circuit 31 is formed by connecting a first voltage divider resistance R1 and a second voltage divider resistance R2 in series between the source of the interrupting MOSFET and the negative electrode of the battery 92, and the gate of the interrupting MOSFET is connected to the portion shared by the first voltage divider resistance R1 and the second voltage divider resistance R2.

The drive MOSFETs 32 are, for example, N-channel MOSFETs. In each drive MOSFET 32, the drain is arranged on the voltage divider circuit 31-side, and the source is arranged on the negative electrode side of the battery 92. Each drive MOSFET 32 includes a parasitic diode 32D. The cathode of the parasitic diode 32D is arranged on the voltage divider circuit 31-side, and the anode of the parasitic diode 32D is arranged on the negative electrode-side of the battery 92.

The pre-driver circuit 50 includes a start circuit 55 that connects the second voltage output portion 51A of the booster circuit 51 to the voltage divider circuits 31 via respective start MOSFETs 52. The start MOSFETs 52 are, for example, N-channel MOSFETs. In the start MOSFET 52, the drain is arranged on the booster circuit 51-side, and the source is provided on the voltage divider circuit 31-side. In a parasitic diode 52D of the start MOSFET 52, the cathode is arranged on the booster circuit 51-side, and the anode is arranged on the voltage divider circuit 31-side.

When the drive MOSFETs 32 and the start MOSFETs 52 are both off, gate signals are not transmitted to the interrupting MOSFETs 43 and 44. Therefore, the interrupting MOSFETs 43 and 44 are kept off.

The gates of the start MOSFETs 52 and the drive MOSFETs 32 are connected to the control circuit 48, and turned on by the gate signals from the control circuit 48. When the start MOSFETs 52 are turned on, the difference voltage (V2−V1), which corresponds to the difference between the first voltage V1 and the second voltage V2, is applied between the both terminals of each of the voltage divider circuits 31, that is, between the source and the gate of each of the interrupting MOSFETs 43 and 44. Thus, the interrupting MOSFETs 43 and 44 are turned on.

The motor drive circuit 40 according to the first embodiment includes a reverse connection protection circuit 70. The reverse connection protection circuit 70 is formed of, for example, an NPN transistor 71 and a compensation drive circuit 72. The transistor 71 is connected in parallel to the first voltage divider resistance R1 that forms the voltage divider circuit 31 between the source and the gate of the second interrupting MOSFET 44. More specifically, a collector is connected to one end of the first voltage divider resistance R1 that forms the voltage divider circuit 31, and an emitter is connected to the other end of the first voltage divider resistance R1.

The compensation drive circuit 72 is connected to the transistor 71 and the negative electrode of the battery 92. The compensation drive circuit 72 is formed by connecting a first resistance R3 to the transistor 71 at a position between a base and the emitter, connecting a second resistance R4 and a diode 75 in series in this order in the direction from the base toward the negative electrode of the battery 92, and arranging the cathode of the diode 75 on the second resistance R4-side.

The structure according to the first embodiment has been described above. The effects of the first embodiment will be described below. First, the case where the positive and negative electrodes of the battery 92 are properly connected to the motor drive circuit 40 will be described.

When the ignition switch 94 is turned on, electric power is supplied to the booster circuit 51, and the voltage output from the battery 92 is boosted from the first voltage V1 to the second voltage V2. When the start MOSFETs 52 and the drive MOSFETs 32 are turned on by the gate signals from the control circuit 48, the difference voltage, which corresponds to the difference between the first voltage V1 and the second voltage V2, is applied between the both ends of each of the voltage divider circuits 31, that is, between the source and the gate of each of the interrupting MOSFETs 43 and 44, and the interrupting MOSFETs 43 and 44 are turned on. Then, conduction between the battery 92 and the inverter circuit 41 is permitted, and the inverter circuit 41 converts the direct-current output from the battery 92 into the three-phase alternating-current, and supplies the three-phase alternating current to the motor 19. Thus, a steering operation performed on the steering wheel 17 by the driver is assisted by the assist torque generated by the motor 19.

The control circuit 48 turns off the start MOSFETs 52 after the interrupting MOSFETs 43 and 44 are turned on. At the same time, the control circuit 48 continuously transmits the gate signals to the drive MOSFETs 32 to keep the drive MOSFETs 32 on. Even after the start MOSFETs 52 are trued off, the gate signals are transmitted to the interrupting MOSFETs 43 and 44 via the main drive circuits 30. Therefore, the interrupting MOSFETs 43 and 44 are kept on.

When the battery 92 is properly connected to the motor drive circuit 40, the base voltage of the transistor 71 does not exceed the emitter voltage. Therefore, the base current does not flow from the base to the emitter, and the transistor 71 is kept off. That is, the situation where the source and the gate of the second interrupting MOSFET 44 are short-circuited by the transistor 71 and the second interrupting MOSFET 44 is turned off does not occur. In addition, provision of the diode 75 in the compensation drive circuit 72 makes it possible to reliably prevent current leak through the compensation drive circuit 72.

If an abnormal situation where the inverter circuit 41 cannot be used occurs during power supply to the motor 19, the control circuit 48 stops transmission of the gate signals to the drive MOSFETs 32 to turn off the drive MOSFETs 32. Then, transmission of the gate signals to the interrupting MOSFETs 43 and 44 is stopped and the interrupting MOSFETs 43 and 44 are turned off. In this case, a current path that includes the parasitic diode 43D of the interrupting MOSFET 43 and the parasitic diode 44D of the interrupting MOSFET 44 is not formed. Therefore, conduction between the battery 92 and the inverter circuit 41 is interrupted.

If the steering wheel 17 is operated in this state, the situation where the motor 19 serves as a power generator and the battery 92 is charged with the electric power generated by the motor 19 does not occur. Therefore, the power generation resistance of the motor 19 is excluded from the steering resistance of the steering wheel 17. That is, it is possible to avoid the situation where a significantly large force is required to operate the steering wheel 17 due to the abnormal situation where the inverter circuit 41 cannot be used.

Next, the effects of the first embodiment that are obtained when the positive electrode and the negative electrode of the battery 92 are connected in reverse to the motor drive circuit 40 will be described. If reverse connection of the battery 92 occurs, the parasitic diodes 32D of the drive MOSFETs 32 are turned on and the main drive circuits 30 are placed in the conduction state. Further, the diode 75 included in the compensation drive circuit 72 is turned on.

If the diode 75 is turned on, the base voltage of the transistor 71 exceeds the emitter voltage. Therefore, the base current flows from the base to the emitter, and the transistor 71 is turned on. That is, because conduction between the collector and the emitter of the transistor 71 is permitted, the source and the gate of the second interrupting MOSFET 44 are short-circuited. Thus, the second interrupting MOSFET 44 is kept off. In the parasitic diode 44D of the second interrupting MOSFET 44, the cathode is arranged on the inverter circuit 41-side. Therefore, if reverse connection of the battery 92 occurs, the parasitic diode 44D is also turned off. That is, because the second interrupting MOSFET 44 and the parasitic diode 44D are both turned off, a closed circuit that includes the battery 92 connected to the motor drive circuit 40 in reverse, the inverter circuit 41 and the first feed line L1 is not formed.

Because the backflow prevention diode 95 is provided in the second feed line L2, a closed circuit that includes the battery 92 connected to the motor drive circuit 40 in reverse, the inverter circuit 41, the feed line L3 and the second feed line L2 is not formed.

With the motor drive circuit 40 according to the first embodiment, even if reverse connection of the battery 92 occurs, it is possible to avoid the situation where the both terminals of the battery 2 are short-circuited due to formation of the closed circuit including the battery 92 and the inverter circuit 41. Thus, it is possible to avoid the situation where the interrupting MOSFETs 43 and 44 are broken by a short-circuit current. With the electric power steering apparatus 11 according to the first embodiment, it is possible to prevent a failure that may occur when reverse connection of the battery 92 occurs because the above-described motor drive circuit 40 is provided.

When reverse connection of the battery 92 occurs, a potential difference is caused between the source and the gate of the first interrupting MOSFET 43. Therefore, the first interrupting MOSFET 43 is turned on. Then, a closed circuit including the main drive circuits 30, the transistor 71 and the first interrupting MOSFET 43 is formed. However, it is possible to avoid the situation where the first interrupting MOSFET 43 is broken by an over current, because the voltage divider resistances R1 and R2 are included in the closed circuit.

A second embodiment of the invention will be described below. The second embodiment differs from the first embodiment in that a so-called "electromagnetic relay" is used as the reverse connection protection circuit 70 in the motor drive circuit 40. The other portions are the same as those in the first embodiment. Therefore, the same portions will be denoted by the same reference numerals and the description thereof will be omitted.

Figure 3:
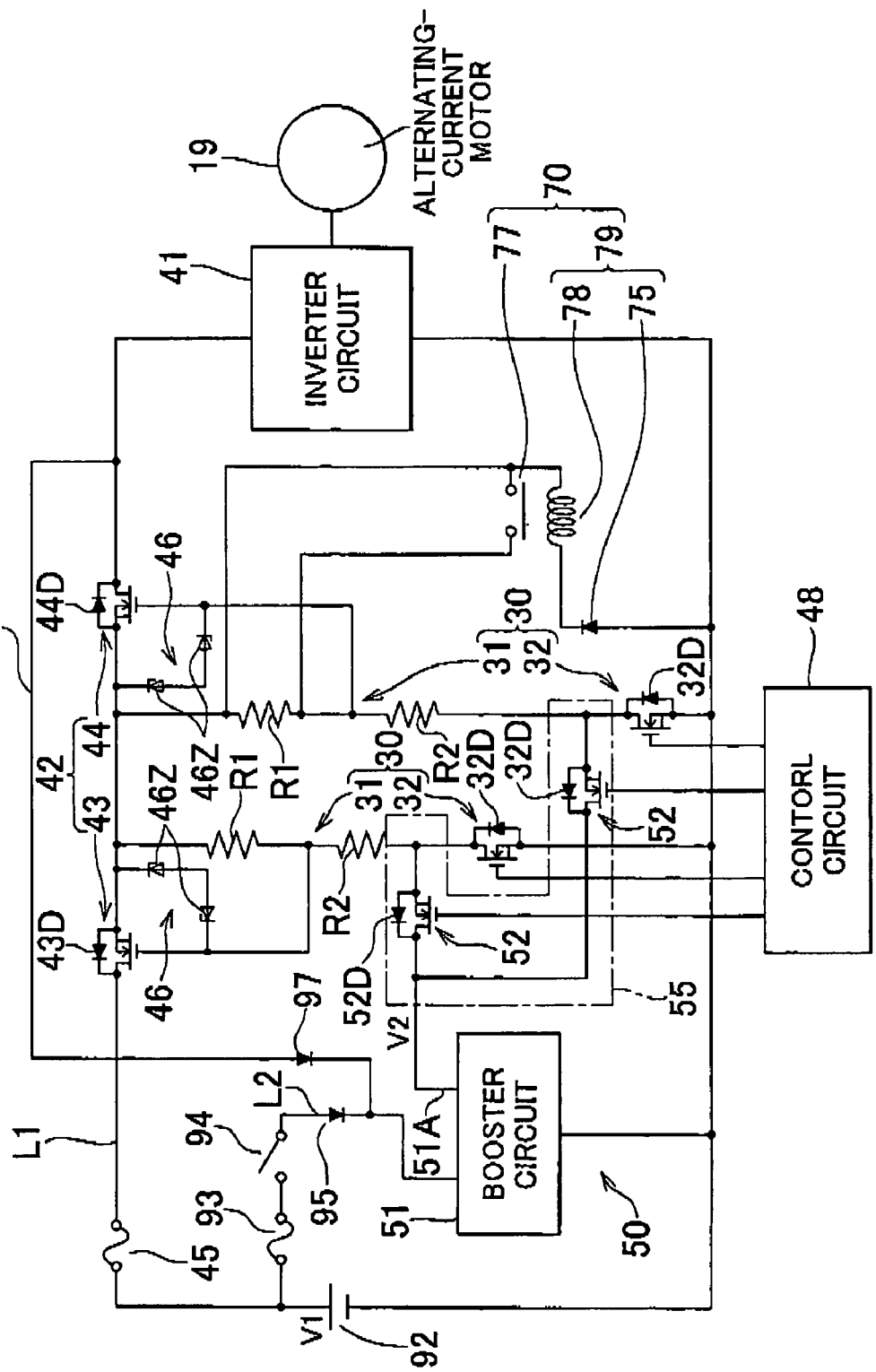
FIG. 3 is a circuit diagram of a motor drive unit according to a second embodiment of the invention.

The reverse connection protection circuit 70 is shown in FIG. 3. The reverse connection protection circuit 70 includes a normally-open relay switch 77 that is connected in parallel to the first voltage divider resistance R1 in the voltage divider circuit 31, and a compensation drive circuit 79 that is formed by connecting an excitation coil 78 and the diode 75 in series in this order in the direction from the relay switch 77 toward the negative electrode of the battery 92 and arranging the cathode of the diode 75 on the excitation coil 78-side.

If the battery 92 is connected to the motor drive circuit 40 properly, the diode 75 is turned off and an electric current is not supplied to the excitation coil 78. Therefore, the relay switch 77 is kept open (off). On the other hand, if the battery 92 is connected in reverse to the motor drive circuit 40, an electric current is supplied to the excitation coil 78 and the excitation coil 78 is excited because the diode 75 is turned on.

Thus, the relay switch 77 is closed (turned on), and the source and the gate of the second MOSFET 44 are short-circuited.

The invention is not limited to the above-described embodiments. For example, embodiments described below are within the technical scope of the invention. In addition, various other modifications may be made to the invention within the scope of the invention.

Figure 4:
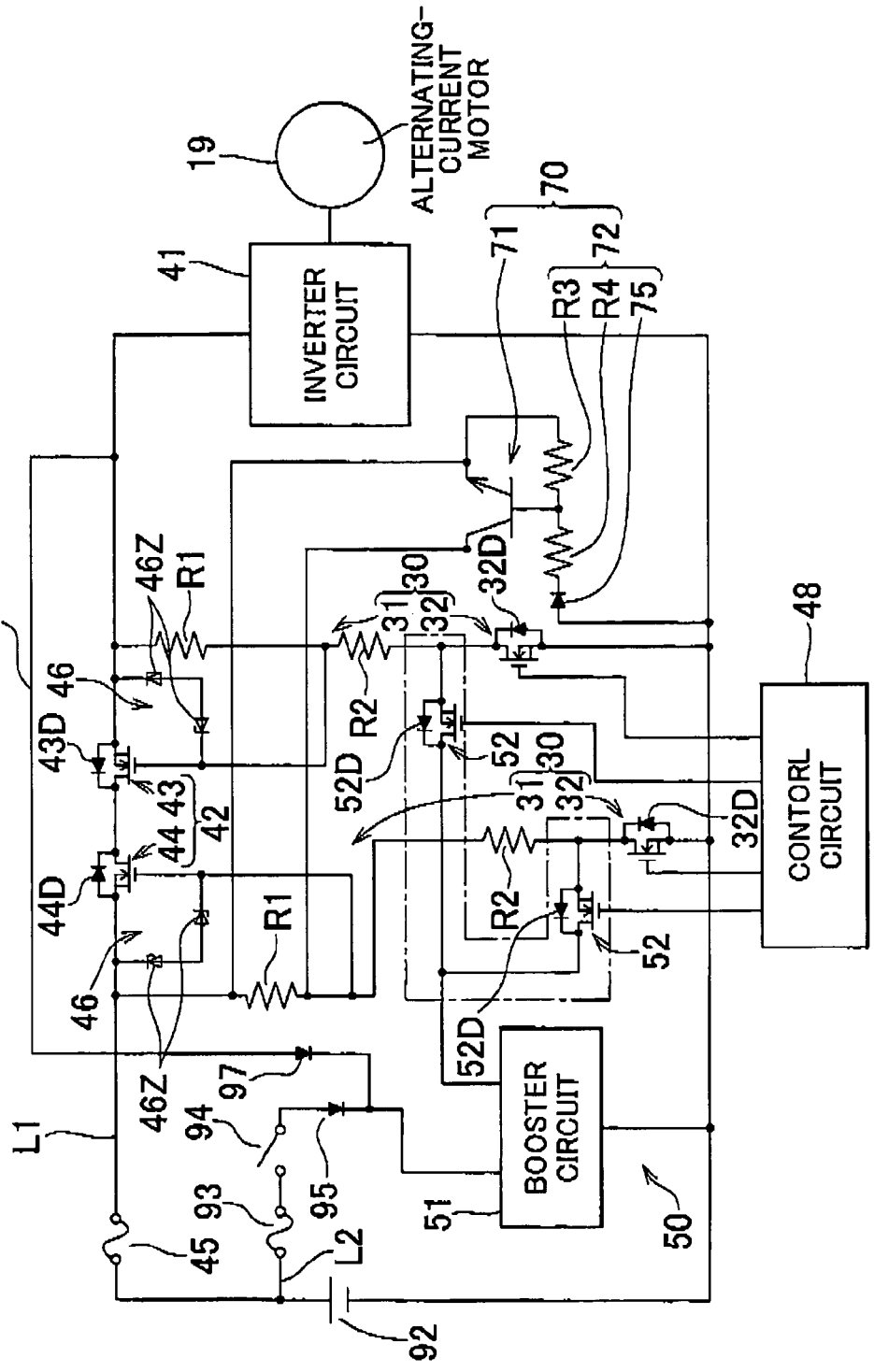
FIG. 4 is a circuit diagram of a motor drive unit according to a modification.
Figure 5:
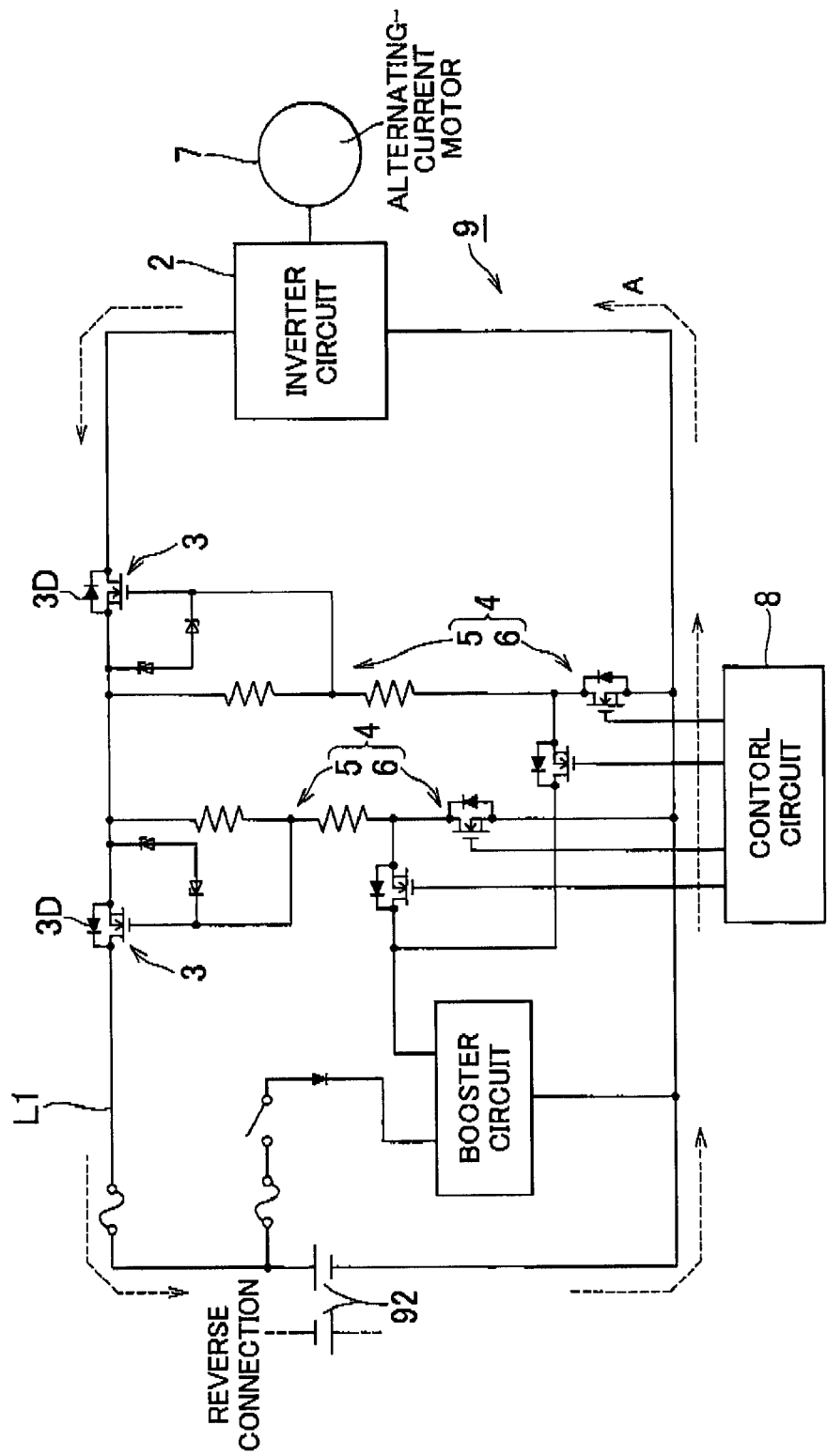
FIG. 5 is a circuit diagram of an existing motor drive circuit.

1) In the first and second embodiments described above, the sources of the interrupting MOSFETs 43 and 44 are connected to each other. Alternatively, as shown in FIG. 4, the drains of the interrupting MOSFETs 43 and 44 may be connected to each other. As in the first and second embodiments, the reverse connection protection circuit 70 may be provided for the second interrupting MOSFET 44 that includes the parasitic diode 44D in which the anode is arranged on the positive electrode side of the battery 92 (cathode is arranged on the inverter circuit 41-side).

2) In the first and second embodiments described above, N-channel MOSFETs are used as the interrupting MOSFETs 43 and 44. Alternatively, P-channel MOSFETs may be used as the interrupting MOSFETs 43 and 44.

3) In the first embodiment, a light-emitting diode or a buzzer may be provided between the collector of the transistor 71 and one end of the first voltage divider resistance R1 or between the emitter of the transistor 71 and the other end of the first voltage divider resistance R1 in the reverse connection protection circuit 70. If reverse connection of the battery 92 occurs, a worker may be notified of the occurrence of reverse connection.

4) In the first and second embodiments described above, the invention is applied to the so-called rack electric power steering apparatus 11 in which the cylindrical motor 19 and the inter-steered wheel shaft 13 are connected with each other by a ball screw mechanism. Alternatively, the invention may be applied to a pinion electric power steering apparatus in which a motor is connected to an inter-steered wheel shaft by a rack-and-pinion mechanism. Further alternatively, the invention may be applied to a column electric power steering apparatus in which a motor is connected to a steering shaft with the use of a gear.

What is claimed is:

1. A motor drive circuit, comprising:
   an inverter that is placed between and connected to a positive electrode and a negative electrode of a direct-current power source;
   a pair of nonuse-time interrupting MOSFETs connected in series and arranged in a feed line that connects the positive electrode of the direct-current power source and the inverter circuit in such a manner that paired parasitic diodes are in opposite orientations;
   a pair of main drive circuits which are formed by connecting voltage divider circuits and drive MOSFETs in series in this order in a direction from sources of the nonuse-time interrupting MOSFETs toward the negative electrode of the direct-current power source, and connecting outputs of the voltage divider circuits to gates of the nonuse-time interrupting MOSFETs;
   a control circuit that transmits gate signals to the pair of drive MOSFETs to keep the pair of nonuse-time interrupting MOSFETs on in a normal situation, and that stops transmission of the gate signals to the pair of drive MOSFETs to turn off the pair of nonuse-time interrupting MOSFETs in an abnormal situation where the inverter circuit is not able to be used;
   a compensation switch element that is connected in parallel to a resistance that forms the voltage divider circuit between the source and the gate of the nonuse-time interrupting MOSFET that has the parasitic diode in which an anode is arranged on a positive electrode side of the direct-current power source; and a compensation drive circuit that is connected to the compensation switch element and the negative electrode of the direct-current power source, wherein when the positive electrode and the negative electrode of the direct-current power source are connected to the motor drive circuit properly, the compensation drive circuit turns off the compensation switch element, and in an abnormal situation where the positive electrode and the negative electrode of the direct-current power source are connected in reverse to the motor drive circuit, the compensation drive circuit turns on the compensation switch element using an output from the direct-current power source connected to the motor drive circuit in reverse.

2. The motor drive circuit according to claim 1, wherein:
the compensation switch element is an NPN transistor; and
a first resistance is connected to the transistor at a position between a base and an emitter and a second resistance is arranged between and connected to the base and the negative electrode of the direct-current power source to form the compensation drive circuit.

3. The motor drive circuit according to claim 2, further comprising:

a booster circuit that boosts a first voltage that is a voltage of the positive electrode with respect to the negative electrode of the direct-current power source to a second voltage, and outputs the second voltage; and a start circuit that connects a second voltage output portion in the booster circuit that outputs the second voltage with the voltage divider circuits in the main drive circuits via start switches, wherein the control circuit turns on the start switches to apply a difference voltage, which corresponds to a difference between the first voltage and the second voltage, between both terminals of each of the voltage divider circuits in order to turn on the nonuse-time interrupting MOSFETs, and turns off the start switches after the nonuse-time interrupting MOSFETs are turned on.

4. An electric power steering apparatus, comprising:
the motor drive circuit according to claim 3, wherein
an alternating-current motor is used as a drive source.

5. An electric power steering apparatus, comprising:
the motor drive circuit according to claim 2, wherein
an alternating-current motor is used as a drive source.

6. An electric power steering apparatus, comprising:
the motor drive circuit according to claim 1, wherein
an alternating-current motor is used as a drive source.

\* \* \* \* \*